United States Patent
Lim

(10) Patent No.: US 10,085,051 B2
(45) Date of Patent: Sep. 25, 2018

(54) METHOD AND APPARATUS FOR CONVERTING MMTP STREAM TO MPEG-2TS

(71) Applicant: Samsung Electronics Co., Ltd., Gyeonggi-do (KR)

(72) Inventor: Youngkwon Lim, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 283 days.

(21) Appl. No.: 14/965,627

(22) Filed: Dec. 10, 2015

(65) Prior Publication Data

US 2016/0241888 A1 Aug. 18, 2016

Related U.S. Application Data

(60) Provisional application No. 62/115,953, filed on Feb. 13, 2015, provisional application No. 62/117,212, filed on Feb. 17, 2015.

(51) Int. Cl.
*H04N 5/917* (2006.01)
*H04N 21/2381* (2011.01)
(Continued)

(52) U.S. Cl.
CPC ..... *H04N 21/2381* (2013.01); *H04N 21/2353* (2013.01); *H04N 21/2362* (2013.01);
(Continued)

(58) Field of Classification Search
CPC ........ H04N 21/23608; H04N 21/8547; H04N 21/23439; H04N 21/2368; H04N 21/242
See application file for complete search history.

(56) References Cited

U.S. PATENT DOCUMENTS

2010/0135646 A1 6/2010 Bang et al.
2013/0125187 A1* 5/2013 Kim ................. H04N 21/23608
725/109

(Continued)

FOREIGN PATENT DOCUMENTS

AU 2014290953 A1 3/2016
KR 10-2008-0090356 10/2008
(Continued)

OTHER PUBLICATIONS

Park et al., "ISO IEC JCT1/SC29/WG11 MPEG/N13293", published Jan. 2013.*
(Continued)

*Primary Examiner* — Kyu Chae

(57) ABSTRACT

A method and an apparatus for converting a moving picture expert group (MPEG) media transport (MMT) stream into a MPEG-2 transport stream (TS). The method including applying restrictions to MMTP packets for the MMTP stream. The method also includes converting a presentation time and decoding time from a coordinated universal time (UTC) based absolute time to a program clock reference time (PCR) based value. The method further includes, when converting the MMTP stream to the MPEG-2 TS, constructing the MMTP stream based on MPEG-2 TS rules without adding or removing data by using a hypothetical receiver buffer model (HRBM). Additionally, the method includes determining values of MPEG-2 TS packet fields of a TS packet layer, an adaptation field and Packetized Elementary Stream (PES) packets from values of the MMTP packets.

20 Claims, 3 Drawing Sheets

(51) Int. Cl.
 *H04N 21/2362* (2011.01)
 *H04N 21/2343* (2011.01)
 *H04N 21/236* (2011.01)
 *H04N 21/235* (2011.01)
 *H04N 21/234* (2011.01)
 *H04N 21/434* (2011.01)
 *H04N 21/4402* (2011.01)
 *H04N 21/44* (2011.01)
 *H04N 21/8547* (2011.01)

(52) U.S. Cl.
 CPC . *H04N 21/23406* (2013.01); *H04N 21/23605* (2013.01); *H04N 21/234309* (2013.01); *H04N 21/4343* (2013.01); *H04N 21/4345* (2013.01); *H04N 21/44004* (2013.01); *H04N 21/440218* (2013.01); *H04N 21/8547* (2013.01)

(56) References Cited

U.S. PATENT DOCUMENTS

| | | | |
|---|---|---|---|
| 2013/0173826 A1* | 7/2013 | Kim | H04L 65/10 709/248 |
| 2013/0195203 A1* | 8/2013 | Syed | H04N 21/23439 375/240.26 |
| 2014/0007172 A1* | 1/2014 | Rhyu | H04N 21/2362 725/109 |
| 2014/0150014 A1* | 5/2014 | Aitken | H04N 21/2381 725/33 |
| 2014/0313289 A1* | 10/2014 | Kim | H04N 13/0051 348/43 |
| 2015/0020138 A1* | 1/2015 | Bae | H04N 21/2343 725/116 |
| 2015/0201207 A1* | 7/2015 | Yie | H04N 21/234 375/240.26 |
| 2015/0201253 A1* | 7/2015 | Lim | H04N 21/4307 725/116 |
| 2015/0215679 A1* | 7/2015 | Hong | H04H 60/82 725/109 |
| 2015/0264404 A1* | 9/2015 | Hannuksela | H04N 19/70 375/240.16 |
| 2015/0273380 A1* | 10/2015 | Sakashita | C04B 38/009 55/522 |
| 2015/0296231 A1* | 10/2015 | Kwon | H04N 21/2362 725/116 |
| 2015/0373380 A1* | 12/2015 | Tsukagoshi | H04N 21/2362 725/109 |
| 2016/0073119 A1* | 3/2016 | Toma | H04N 19/30 375/240.02 |
| 2016/0127757 A1* | 5/2016 | Rushing | G06Q 30/08 725/116 |
| 2016/0142757 A1* | 5/2016 | Toma | H04N 21/26283 725/116 |
| 2016/0261897 A1* | 9/2016 | Kim | H04N 21/2401 |
| 2017/0012765 A1* | 1/2017 | Kitazato | H04L 65/4076 |
| 2017/0048560 A1* | 2/2017 | Tanaka | H04N 21/236 |
| 2017/0064371 A1* | 3/2017 | Kitazato | H04N 5/278 |
| 2017/0111285 A1* | 4/2017 | Lim | H04N 19/44 |
| 2017/0155947 A1* | 6/2017 | Iguchi | H04N 21/434 |
| 2017/0164017 A1* | 6/2017 | Hwang | H04N 21/2381 |
| 2017/0171611 A1* | 6/2017 | Nair | H04N 21/2362 |

FOREIGN PATENT DOCUMENTS

| | | |
|---|---|---|
| KR | 10-2013-0009670 | 1/2013 |
| KR | 10-2015-0010652 | 1/2015 |
| WO | WO 2015/012063 A1 | 1/2015 |

OTHER PUBLICATIONS

Lim, "MMT, new alternative to MPEG-2 TS and RTP", published Jan. 2013.*

ITU-T H.220.0 "Generic coding of moving pictures and associated audio information: Systems", published Jun. 2012.*

Park et al., "Delivery of ATSC 3.0 services with MPEG Media Transport Standard considering Redistribution in MPEG-2 TS Format" published Jan. 29, 2016.*

International Search Report dated Jun. 2, 2016 in connection with International Patent Application No. PCT/KR2016/001440, 3 pages.

Written Opinion of the International Searching Authority dated Jun. 2, 2016 in connection with International Patent Application No. PCT/KR2016/001440, 5 pages.

Kwang-Deok Seo, et al., "A New Timing Model Design for MPEG Media Transport (MMT)", IEEE International Symposium on Broadband Multimedia Systems and Broadcasting, Seoul, Korea, Jun. 27-29, 2012, 5 pages.

* cited by examiner

METHOD AND APPARATUS FOR CONVERTING MMTP STREAM TO MPEG-2 TS

CROSS-REFERENCE TO RELATED APPLICATION(S) AND CLAIM OF PRIORITY

This application claims priority under 35 U.S.C. § 119(e) to U.S. Provisional Patent Application No. 62/115,953, filed Feb. 13, 2015, entitled "METHOD AND APPARATUS FOR CONVERTING MMTP STREAM TO MPEG-2 TS." The above-identified provisional patent application is hereby incorporated by reference in its entirety. The present application also claims priority to U.S. Provisional Patent Application Ser. No. 62/117,212, filed Feb. 17, 2015, entitled "METHOD AND APPARATUS FOR CONVERTING MMTP STREAM TO MPEG-2 TS." The content of the above-identified patent document is incorporated herein by reference

TECHNICAL FIELD

This disclosure relates generally to media data conversion. More specifically, this disclosure relates to a conversion of moving picture experts group (MPEG) media transport protocol (MMTP) format into a MPEG-2 transport stream (TS).

BACKGROUND

MMT is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

MMTP has been adopted by Japanese broadcast industry for Super Hi Vision and has been also selected as one of standards for development of the next generation broadcast standard by Advanced Television Systems Committee (ATSC). As there are many broadcast infrastructures and services still using MPEG-2 TS, there might be cases that MPEG-2 TS is converted to MMT Protocol stream and vice versa. One example is redistribution of MMTP based terrestrial broadcast content to cable TV services using MPEG-2 TS.

SUMMARY

Embodiments of the present disclosure provide a method and an apparatus for converting moving picture expert group (MPEG) media transport (MMT) stream into a MPEG-2 transport stream (TS).

In one embodiment, a method for converting a MMT stream into a MPEG-2 TS. The method including applying restrictions to MMTP packets for an MMTP stream. The method also includes converting a presentation time and decoding time from a coordinated universal time (UTC) based absolute time to a program clock reference time (PCR) based value. The method further includes, when converting the MMTP stream to the MPEG-2 TS, constructing the MMTP stream based on MPEG-2 TS rules when without adding or removing data by using a hypothetical receiver buffer model (HRBM). Additionally, the method includes determining values of MPEG-2 TS packet fields of a TS packet layer, an adaptation field and Packetized Elementary Stream (PES) packets from values of the MMTP packets In another embodiment, an apparatus for converting a MMT stream into a MPEG-2 TS is provided. The apparatus includes processing circuitry configured to apply restrictions to MMTP packets for the MMTP stream. The processing circuitry is also configured to convert a presentation time and decoding time from a coordinated universal time (UTC) based absolute time to a program clock reference time (PCR) based value. The processing circuitry is further configured to, when converting the MMTP stream to the MPEG-2 TS, construct the MMTP stream based on MPEG-2 TS rules without adding or removing data by using a hypothetical receiver buffer model (HRBM). Additionally, the processing circuitry is configured to determine values of MPEG-2 TS packet fields of a TS packet layer, an adaptation field and PES packets from values of the MMTP packets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

MMTP packets carry various data including metadata and signaling messages as depicted in the figure below. Payload data of MMTP packets carrying metadata are processed to generate appropriate MPEG-2 Section data or the values of the fields in the MPEG-2 TS packets or the PES packets. Payload data of MMTP packets carrying MFU data, i.e. the MMTP packets with the value of the FT field is '2', are converted to PES packets.

Figure 1:
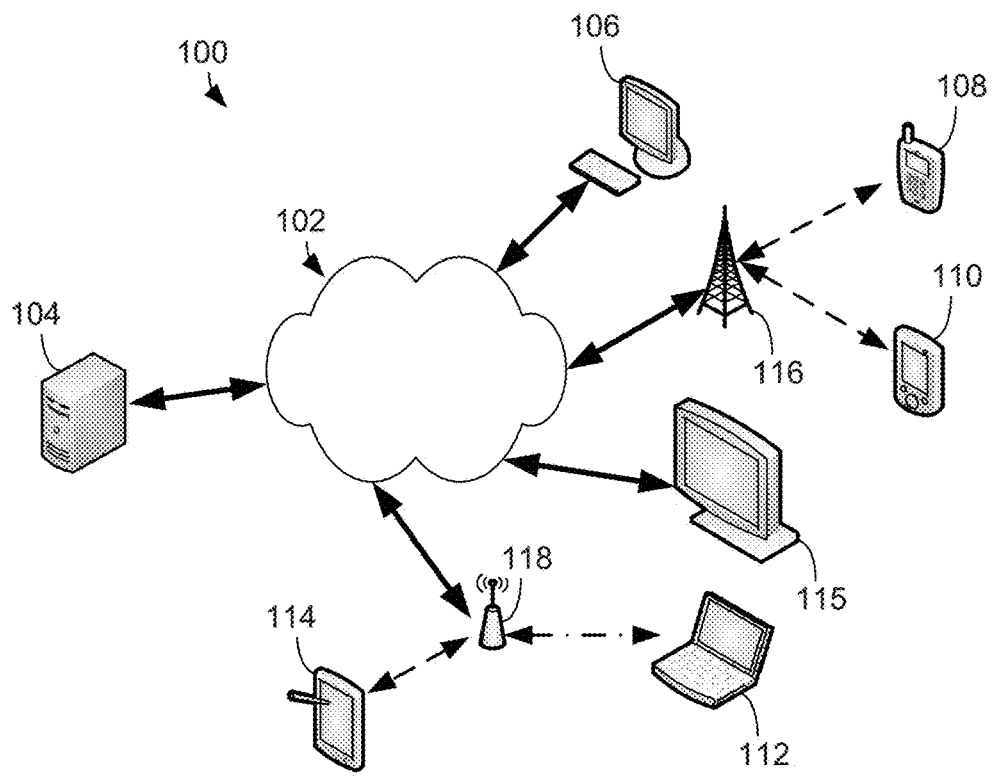
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides conversion of MMTP stream to MPEG-2 TS, as will be discussed in greater detail below. For example, server 104 or client devices 108-114 may provide for conversion of MMTP stream to MPEG-2 TS.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
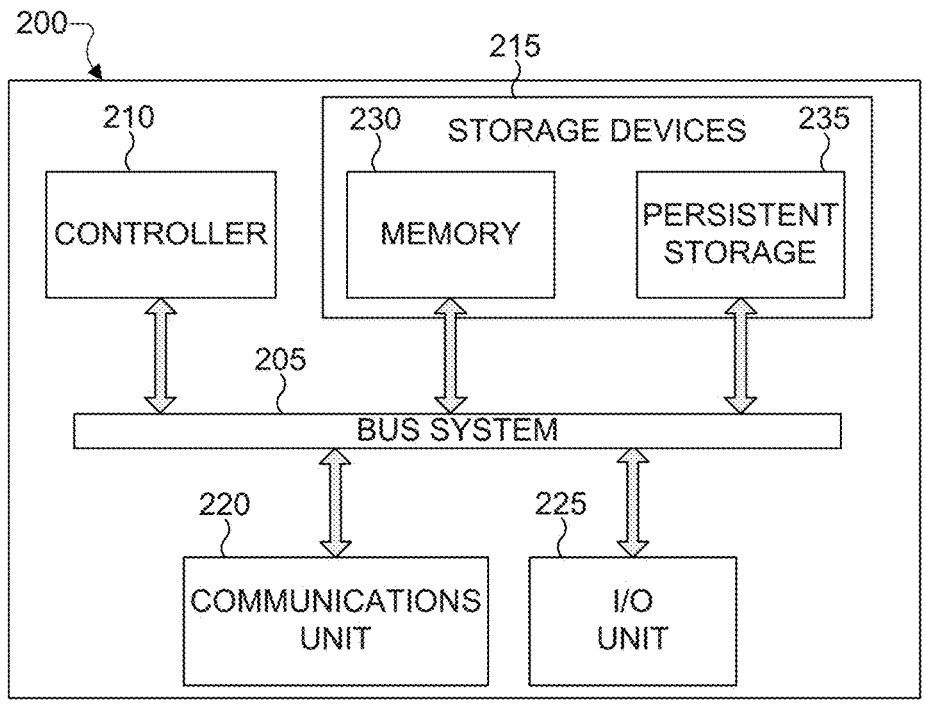
FIGS. 2 and 3 illustrate example devices in a computing system according to various embodiments of the present disclosure.
Figure 3:
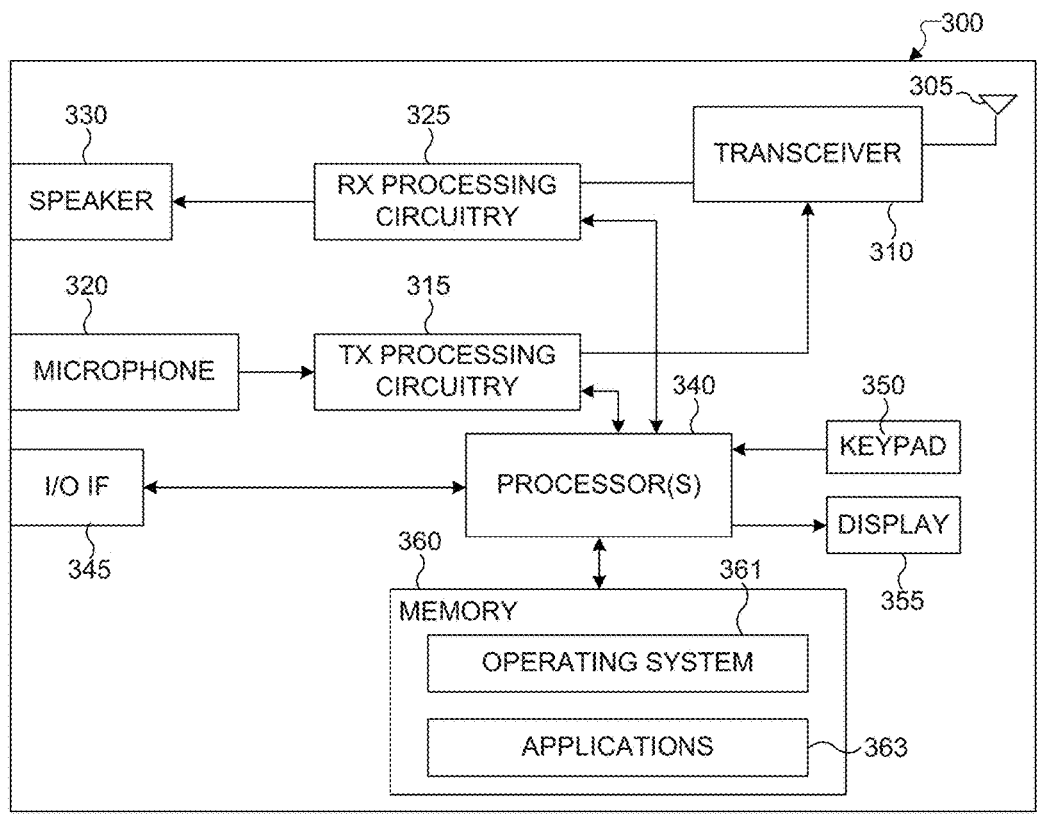

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communications unit 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides conversion of MMTP stream to MPEG-2 TS, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for converting a MMT stream into a MPEG-2 TS. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display unit 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a Flash memory or other read-only memory (ROM).

As will be discussed in greater detail below, in this illustrative embodiment, client device 300 implements an apparatus that receives encoded videos from server 104 over network 102 and conversion of MMTP stream to MPEG-2 TS. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
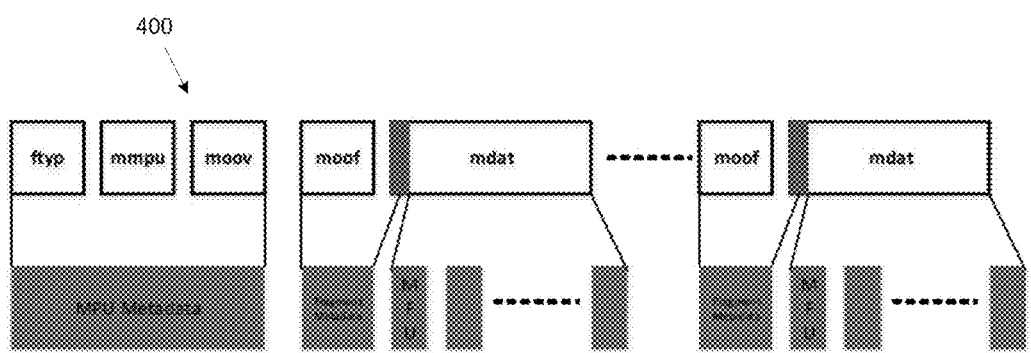
FIG. 4 illustrates an exemplary diagram of packetization of timed media data in accordance with various embodiments of the present disclosure.

FIG. 4 illustrates an exemplary diagram 400 of packetization of timed media data in accordance with various embodiments of the present disclosure. The packetization of an media processing unit (MPU) that contains timed media may be performed in an MPU format-aware and/or MPU format agnostic mode. In the MPU format agnostic mode, the MPU is packetized into data units of equal size (except for the last data unit, of which the size may differ) or a predefined size according to the size of MTU of the underlying delivery network by using generic file delivery (GFD). In other words, the packetization of the MPU format agnostic mode may only consider the size of data to be carried in the packet. The type field for the MMTP packet header is set to 0x00 to indicate that the packetization is format agnostic mode.

In the MPU format-aware mode the packetization procedure takes into account the boundaries of different types of data in MPU to generate packets by using MPU mode. The resulting packets carry delivery data units of either MPU metadata, movie fragment metadata, or MFU. The resulting packets may not carry more than two different types of delivery data units. The delivery data unit of MPU metadata is assigned the DU_type 0x01. The MPU metadata includes the 'ftyp' box, the 'mmpu' box, the 'moov' box, and any other boxes that are applied to the whole MPU. The delivery data unit of movie fragment metadata consists of the 'moof' box and the 'mdat' box header (excluding any media data) and is assigned the DU_type 0x02. The media data, MFUs in mdat box of MPU, is then split into multiple delivery data units of MFU in a format aware way. This may, for example, be performed with the help of the MMT hint track. The MFU may include 1) only media data, 2) media data with a sequence number, and 3) media data with some control information. Each MFU is prepended the MFU header, which has the syntax and semantics. The MFU header is followed by the media data of the MFU.

Figure 5:
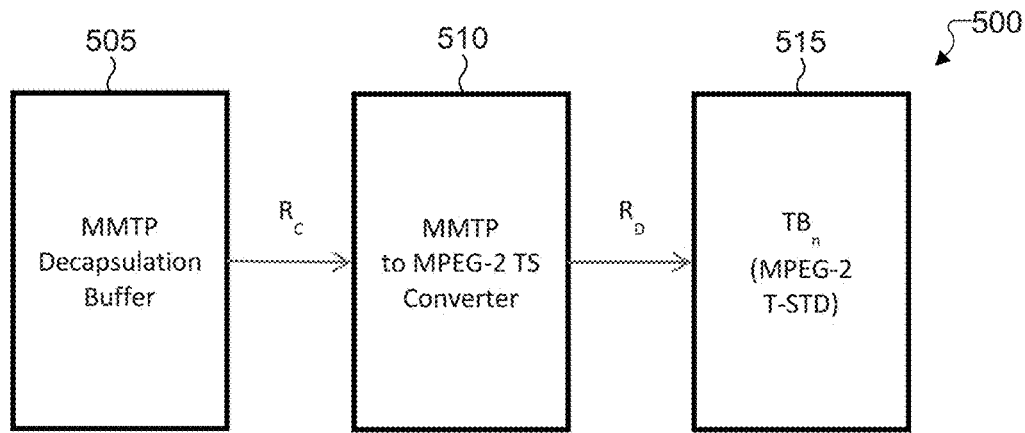
FIG. 5 illustrates a relationship between a hypothetical receiver buffer model (HRBM) and MPEG-2 T-STD according to various embodiments of this disclosure.

FIG. 5 illustrates a relationship between a hypothetical receiver buffer model (HRBM) and MPEG-2 T-STD according to various embodiments of this disclosure.

The relationship between HRBM and MPEG-2 T-STD can be conceptually represented in FIG. 5. In FIG. 5, there is no processing delay added by MMTP to MPEG-2 TS converter 510. The MMTP to MPEG-2 TS converter 510 reads reconstructed media data from MMTP decapsulation buffer 505 with fixed rate, $R_C$ and delivers MPEG-2 TS packets to the transport buffer ($TB_n$) 515 with fixed rate $R_D$, where $R_D$ is the rate increased from $R_C$ by fixed amount due to MPEG-2 TS packet header overhead introduced by a conversion operation. The $TB_n$ 515 is emptied each second, so at each second there is no more media data in the MMTP decapsulation buffer 505 available for conversion operation before the data from the next MMTP packet is delivered to MMTP decapsulation buffer 505.

The MMTP decapsulation buffer 505 de-packetizes the MMTP packets received and reconstructs MPUs. The reconstructed MPUs are delivered to the MMTP to MPEG02 TS converter 510. Additional details of MMTP packet processing and the fixed end-to-end delay of the HRBM may be found in US Patent Application Number 2014/0098811 filed Oct. 8, 2013, entitled "METHOD AND APPARATUS FOR MEDIA DATA DELIVERY CONTROL," which is incorporated by reference herein.

Figure 6:
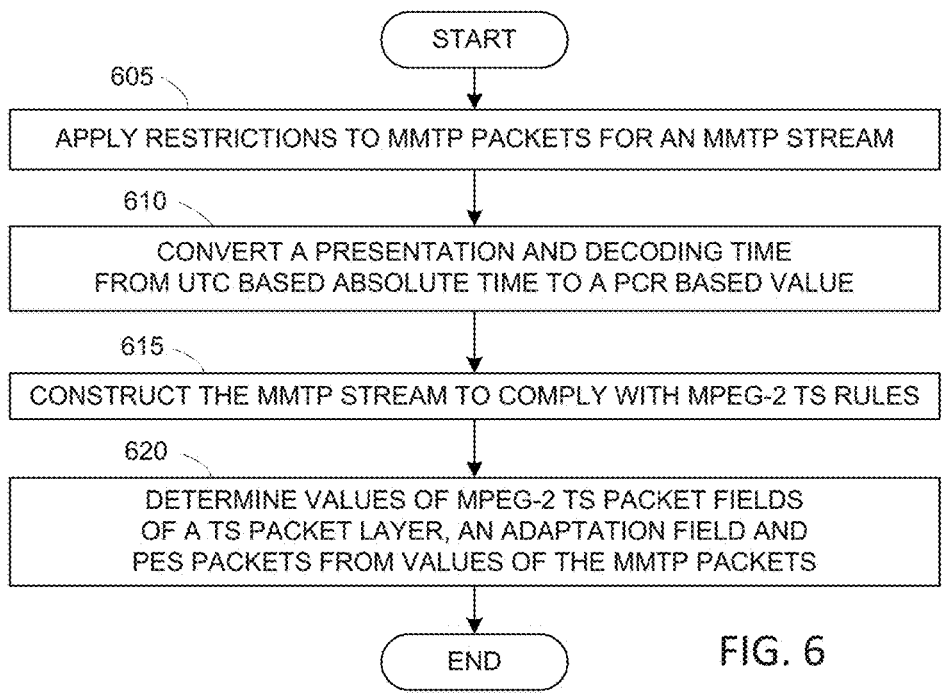
FIG. 6 illustrates a process for converting an MMTP stream to an MPEG-2 TS according to various embodiments of this disclosure.

FIG. 6 illustrates a process 600 for converting an MMTP stream to an MPEG-2 TS according to various embodiments of this disclosure.

In operation 605, the system applies restrictions to MMTP packets for an MMTP stream. MMTP allows a highly flexible operation. Many fields of MMTP packets with wide range of values are allowed and many features are configurable in various ways. As the fields of the MMTP packets can be beyond the operation range of MPEG-2 TS, restrictions are applied to MMTP streams to ensure efficient conversion into MPEG-2 TS. One restriction of the MMTP packets is that media track data includes codec initialization information. For example, MPUs carrying advanced video coding (AVC) video bitstream carry all sequence and picture parameter sets (SPS and PPS) necessary for decoding the AVC video stream within that AVC video stream. Another example of a restriction of the MMTP packets is that a value of a packet_id field of the MMTP packets is between 0x0010 and 0x1FFE.

In operation 610, the system converts a presentation time and decoding time from a coordinated universal time (UTC) based absolute time to a program clock reference time (PCR) based value. In MMTP stream, presentation time and decoding time are represented as wall clock time, i.e. UTC based absolute time. As presentation time and decoding time in MPEG-2 TS are represented by using PCR as a clock reference, presentation time and decoding time of media data carried by the MMTP stream are converted to PCR based values. For the conversion, the UTC based presentation time and decoding time of media data carried by MMTP are calculated by combining a value specified in a MPU-_timestamp_descriptor that provides a presentation time of an earliest sample in a media processing unit (MPU) in presentation order and a composition time relative to an earliest sample in the MPU in presentation order known by a movie fragment box data. The presentation time and decoding time in UTC are converted to presentation time and decoding time referencing PCR. Considering the clock of the client processing MPEG-2 TS is locked to the clock of the sender, presentation time and decoding time can be calculated by using following formulas:

$$P_{PCR} = T_{PCR} + \frac{P_{UTC} - T_{UTC}}{2^{32}} \times 90{,}000 \quad \text{(eq. 1)}$$

$$D_{PCR} = T_{PCR} + \frac{D_{UTC} - T_{UTC}}{2^{32}} \times 90{,}000 \quad \text{(eq. 2)}$$

where $T_{PCR}$ is a value of a current PCR sample in 90 KHz, $T_{UTC}$ is a value of a current time in UTC, $P_{PCR}$ is a value of a presentation time of a media data in 90 KHz, $P_{UTC}$ is a value of a presentation time in UTC, $D_{PCR}$ is a value of a decoding time of a media data in 90 KHz referencing PCR, and $D_{UTC}$ is a value of a decoding time in UTC.

In operation 615, the system constructs the MMTP stream to comply with MPEG-2 TS rules when converted to MPEG-2 TS without adding or removing data by using a HRBM. As MPEG-2 TS complies to the rules regarding MPEG-2 T-STD, the MMTP stream must be constructed in a way that the MPEG-2 TS converted from the MMTP stream complies to MPEG-2 TS rules without adding or removing data by using HRBM of MMT. As HRBM allows precise control of distance between MMTP packets, in other words when the media data of each MMTP packets available to the next entity connected to HRBM buffers, the MMTP stream is constructed to meet such requirement by deciding a timestamp of each MMTP packets appropriately by using HRBM. The relationship between HRBM and MPEG-2 T-STD can be conceptually represented as FIG. 5. In FIG. 5, there is no processing delay added by the MMTP to MPEG-2 TS converter. The MMTP to MPEG-2 TS converter reads reconstructed media data from MMTP decapsulation buffer with a fixed rate, $R_C$, and delivers MPEG-2 TS packets to $TB_n$ with fixed rate, $R_D$, where $R_D$ is the rate increased from $R_C$ by fixed amount due to MPEG-2 TS packet header overhead introduced by conversion operation. As the $TB_n$ requires being empty each second, at each second there is no media data in MMTP decapsulation buffer available for conversion operation before the data from the next MMTP packet is delivered to the MMTP decapsulation buffer.

In operation 620, the system determines the values of the MPEG-2 TS packet fields in the TS packet layer, adaptation field, and the PES packets from values of the MMTP packets. The tables below provide basic rules to determine the value of the fields of MPEG-2 TS packet and PES packets. The value of the fields not specified in the tables below may not be directly determined from the values of the fields of MMTP packets or signaling information, but determined according to semantics defined in ISO/IEC 13818-1.

| MPEG-2 TS packet fields in TS packet layer | Rule for conversion from MMTP packets |
|---|---|
| payload_unit_start_indicator | The value of this field is set to '1' if the TS packet is the first packet converted from the MMTP packet with the value of the f_i field is either '00' or '01' |
| transport_priority | The value of this field is set to '1' if the TS packet is converted from the MMTP packets with the priority field is smaller than a certain threshold value set by conversion system. If the threshold value is not provided by conversion system then the TS packet generated from the MMTP packet with the value of the priority field is '0' is set to '1'. |
| PID | The value of this field is set to the same value of the packet_id field of the MMTP packet used to generate this TS packet. |

| MPEG-2 TS packet fields in adaptation field | Rules for conversion from MMTP packets |
|---|---|
| random_access_indicator | The value of this field is set to '1' if the MPEG-2 TS packet is the first packet generated from a MMTP packet with the value of the R field is '1' |
| elementary_stream_priority_indicator | The value of this field is set to '1' if the TS packet is converted from the MMTP packets with the priority field is smaller than a certain threshold value set by conversion system. If the threshold value is not provided by conversion system then the TS packet generated from the MMTP packet with the value of the priority field is '0' is set to '1'. |

| MPEG-2 TS packet field in PES packet | Rules for conversion from MMTP packets |
|---|---|
| stream_id | The value of this field is determined by the value of the asset_type field of MP table |
| PES_priority | The value of this field is set to '1' if the TS packet is converted from the MMTP packets with the priority field is smaller than a certain threshold value set by conversion system. If the threshold value is not provided by conversion system then the TS packet generated from the MMTP packet with the value of the priority field is '0' is set to '1'. |
| data_alignment_indicator | The value of this field is set to '1' |
| PTS | The value of this field is calculated from composition time of media data. The value of $P_{PCR}$ in section Error! Reference source not found. is used |
| DTS | The value of this field is calculated from decoding time of media data. The value of $D_{PCR}$ in section Error! Reference source not found. is used. |

Although FIG. 6 illustrates examples of a processes for conversion of an MMTP stream to a MPEG-2 TS, respectively, various changes could be made to FIG. 6. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for converting a moving picture expert group (MPEG) media transport protocol (MMTP) stream into a MPEG-2 transport stream (TS), the method comprising:

applying restrictions to MMTP packets for the MMTP stream;
converting a presentation time and decoding time from a coordinated universal time (UTC) based absolute time to a program clock reference time (PCR) based value;
when converting the MMTP stream to the MPEG-2 TS, constructing the MMTP stream based on MPEG-2 TS rules without adding or removing data by using a hypothetical receiver buffer model (HRBM);
determining, according to conversion rules using values of the MMTP packets, (i) values of MPEG-2 TS packet fields of a TS packet layer, (ii) an adaptation field, and (iii) packetized elementary stream (PES) packets; and
setting the values of the MPEG-2 TS packet fields of the TS packet layer according to the conversion rules.

2. The method of claim 1, wherein one of the restrictions applied to the MMTP packets is that media track data includes codec initialization information.

3. The method of claim 1, wherein one of the restrictions applied to the MMTP packets is that a value of a packet_id field of the MMTP packets is between 0x0010 and 0x1FFE.

4. The method of claim 1, wherein converting the presentation time and the decoding time comprises combining a value specified in a MPU_timestamp_descriptor that provides a presentation time of an earliest sample in a media processing unit (MPU) in presentation order and a composition time relative to an earliest sample in the MPU in presentation order known by a movie fragment box data.

5. The method of claim 4, wherein converting the presentation time and the decoding time further comprises calculating the presentation time and the decoding time using $$P_{PCR} = T_{PCR} + \frac{P_{UTC} - T_{UTC}}{2^{32}} \times 90,000 \text{ and}$$

$$D_{PCR} = T_{PCR} + \frac{D_{UTC} - T_{UTC}}{2^{32}} \times 90,000$$

where $T_{PCR}$ is a value of a current PCR sample in 90 KHz, $T_{UTC}$ is a value of a current time in UTC, $P_{PCR}$ is a value of a presentation time of a media data in 90 KHz, $P_{UTC}$ is a value of a presentation time in UTC, $D_{PCR}$ is a value of a decoding time of a media data in 90 KHz referencing PCR, and $D_{UTC}$ is a value of a decoding time in UTC.

6. The method of claim 1, further comprising:
reading reconstructed media data from an MMTP decapsulation buffer with a fixed rate, $R_C$; and
delivering MPEG-2TS packets to a transport buffer ($TB_n$) with a fixed rate $R_D$,
wherein $R_D$ is a rate increased from $R_C$ by a fixed amount due to a MPEG-2 TS packet header overhead determined by the conversion of the presentation time and the decoding time.

7. The method of claim 6, wherein the MMTP decapsulation buffer is empty at each second before the data from a next MMTP packet is delivered for conversion to the MMTP decapsulation buffer.

8. The method of claim 1, wherein setting the values of the MPEG-2 TS packet fields of the TS packet layer comprises:
setting a payload_unit_start_indicator field to a value of '1' when the MPEG-2 TS packet is a first packet converted from the MMTP packets with a value in an f_i field is either '00' or '01';
setting a transport_priority field to a value of '1' when the MPEG-2 TS packet is converted from the MMTP packets with a priority field smaller than a threshold value; and
setting a packet_id (PID) field to a value of a packet_id field of the MMTP packet.

9. The method of claim 1, wherein setting the values of the MPEG-2 TS packet fields of the adaptation field comprises:
setting a random_access_indicator field to a value of '1' when the MPEG-2 TS packet is a first packet generated from the MMTP packets with a value of an 'R' field is '1'; and
setting an elementary_stream_priority_indicator field to a value of '1' when the MPEG-2 TS packet is converted from the MMTP packets with a priority field smaller than a threshold value.

10. The method of claim 1, wherein setting the values of the MPEG-2 TS packet fields of the PES packets comprises:
setting a stream_id field to a value of an asset_type field of the MMTP packet;
setting a PES_priority field to a value of '1' when the MPEG-2 TS packet is converted from the MMTP packets with a priority field smaller than a threshold value;
setting a data_alignment_indicator field to a value of '1';
setting a PTS field to a value calculated from a composition time of media data; and
setting a DTS field to a value calculated from the decoding time of the media data.

11. An apparatus for converting a moving picture expert group (MPEG) media transport protocol (MMTP) stream into a MPEG-2 transport stream (TS), the apparatus comprising:
a memory configured to store MMTP packets for the MMTP stream;
processing circuitry operably connected to the memory, the processing circuitry configured to:
apply restrictions to the MMTP packets for the MMTP stream;
convert a presentation time and decoding time from a coordinated universal time (UTC) based absolute time to a program clock reference time (PCR) based value;
when converting the MMTP stream to the MPEG-2 TS, construct the MMTP stream based on MPEG-2 TS rules without adding or removing data by using a hypothetical receiver buffer model (HRBM);
determine, according to conversion rules using values of the MMTP packets, (i) values of MPEG-2 TS packet fields of a TS packet layer, (ii) an adaptation field, and (iii) packetized elementary stream (PES) packets; and
set the values of the MPEG-2 TS packet fields of the TS packet layer according to the conversion rules.

12. The apparatus of claim 11, wherein one of the restrictions applied to the MMTP packets is that media track data includes codec initialization information.

13. The apparatus of claim 11, wherein one of the restrictions applied to the MMTP packets is that a value of a packet_id field of the MMTP packets is between 0x0010 and 0x1FFE.

14. The apparatus of claim 11, wherein the processing circuitry is further configured to combine a value specified in a MPU_timestamp_descriptor that provides a presentation time of an earliest sample in a media processing unit (MPU) in presentation order and a composition time relative to an earliest sample in the MPU in presentation order known by a movie fragment box data.

15. The apparatus of claim 14, wherein the processing circuitry is further configured to calculate the presentation time and the decoding time using $$P_{PCR} = T_{PCR} + \frac{P_{UTC} - T_{UTC}}{2^{32}} \times 90,000 \text{ and}$$

$$D_{PCR} = T_{PCR} + \frac{D_{UTC} - T_{UTC}}{2^{32}} \times 90,000$$

where $T_{PCR}$ is a value of a current PCR sample in 90 KHz, $T_{UTC}$ is a value of a current time in UTC, $P_{PCR}$ is a value of a presentation time of a media data in 90 KHz, $P_{UTC}$ is a value of a presentation time in UTC, $D_{PCR}$ is a value of a decoding time of a media data in 90 KHz referencing PCR, and $D_{UTC}$ is a value of a decoding time in UTC.

16. The apparatus of claim 11, wherein the processing circuitry is further configured to:
    read reconstructed media data from an MMTP decapsulation buffer with a fixed rate, $R_C$; and
    deliver MPEG-2TS packets to a transport buffer ($TB_n$) with a fixed rate $R_D$,
    wherein $R_D$ is a rate increased from $R_C$ by a fixed amount due to a MPEG-2 TS packet header overhead determined by the conversion of the presentation time and the decoding time.

17. The apparatus of claim 16, wherein the processing circuitry is further configured to empty the MMTP decapsulation buffer at each second before the data from a next MMTP packet is delivered for conversion to the MMTP decapsulation buffer.

18. The apparatus of claim 11, wherein the processing circuitry is further configured to:
    set a payload_unit_start_indicator field to a value of '1' when the MPEG-2 TS packet is a first packet converted from the MMTP packets with a value in an f_i field is either '00' or '01';
    set a transport_priority field to a value of '1' when the MPEG-2 TS packet is converted from the MMTP packets with a priority field smaller than a threshold value; and
    set a PID field to a value of a packet_id field of the MMTP packet.

19. The apparatus of claim 11, wherein the processing circuitry is further configured to:
    set a random_access_indicator field to a value of '1' when the MPEG-2 TS packet is a first packet generated from the MMTP packets with a value of an 'It' field is '1'; and
    set an elementary_stream_priority_indicator field to a value of '1' if the MPEG-2 TS packet is converted from the MMTP packets with a priority field smaller than a threshold value.

20. The apparatus of claim 11, wherein the processing circuitry is further configured to:
    set a stream_id field to a value of an asset_type field of the MMTP packet;
    set a PES_priority field to a value of '1' when the MPEG-2 TS packet is converted from the MMTP packets with a priority field smaller than a threshold value;
    set a data_alignment_indicator field to a value of '1';
    set a PTS field to a value calculated from a composition time of media data; and
    set a DTS field to a value calculated from the decoding time of the media data.

* * * * *